(12) United States Patent
Cox et al.

(10) Patent No.: US 6,182,361 B1
(45) Date of Patent: Feb. 6, 2001

(54) METHOD FOR ASSEMBLING A CAMSHAFT

(75) Inventors: Allan D. Cox, Thomaston; Giovanni C. Albini, Watertown; Robert E. Schomburg; William A. Gordon, both of Collinsville, all of CT (US)

(73) Assignee: The Torrington Company, Torrington, CT (US)

( * ) Notice: Under 35 U.S.C. 154(b), the term of this patent shall be extended for 0 days.

(21) Appl. No.: 09/315,716

(22) Filed: May 20, 1999

(51) Int. Cl.$^7$ ............................................. B23P 15/00
(52) U.S. Cl. ........................... 29/888.1; 29/523; 74/567
(58) Field of Search ................... 29/888.1, 523; 74/567, 569

(56) References Cited

U.S. PATENT DOCUMENTS 3,869,938 * 3/1975 Schlotterbeck et al. ............... 74/567
4,798,178 * 1/1989 Greulich et al. ..................... 123/90.6

FOREIGN PATENT DOCUMENTS

675006 A5 * 8/1990 (CH).
3346056 A1 * 12/1983 (DE).
275842 * 8/1927 (GB).
60-81569 * 5/1985 (JP).
60-83731 * 5/1985 (JP).

* cited by examiner

Primary Examiner—I Cuda Rosenbaum
(74) Attorney, Agent, or Firm—Robert F. Palermo; John C. Bigler

(57) ABSTRACT

A method for making a lightweight composite camshaft, includes the steps of providing at least one lightweight cam element having a lobed outer surface and a hub with a cylindrical bore, at least a portion of the hub not being radially occluded by the outer surface; providing at least one lightweight journal element having a cylindrical outer surface and a hub with a cylindrical bore, at least a portion of the hub not being radially occluded by said outer surface; providing a hollow cylindrical tubular shaft member having a diameter sized to form a snug sliding fit in the hubs of the cam element and the journal element; positioning the cam and journal elements on the shaft in required axial and radial orientations; and applying means, on the hub of each element and that portion of the shaft which is in registry with the hub, for establishing a permanent interlock to fix each element in its required axial and radial orientation on the shaft.

14 Claims, 3 Drawing Sheets

METHOD FOR ASSEMBLING A CAMSHAFT

BACKGROUND OF THE INVENTION

This invention relates generally to camshafts for machines and more particularly to lightweight assembled camshafts for motor vehicle engines and methods for assembling such camshafts.

Assembled camshafts for motor vehicles and other machines have been made for more than 60 years, in order to decrease cost and weight of the camshafts relative to those made by conventional casting, forging, machining, grinding, hardening and straightening techniques. In some cases, the camshafts have been built up from several segments which were assembled and welded end-to end to form the shaft. In other cases, the cam and journal elements have been preformed with cylindrical axial bores, by casting, forging, or powder metallurgy techniques, and positioned on a shaft or hollow tube and welded in place. In still other cases, preformed elements having axially extending radial depressions have been positioned on a hollow tube and the tube has been expanded, usually by forcing a tool with one or more radial projections through the tube, to lock the cam and journal elements in desired radial and axial positions thereon.

Additional weight reduction has been attained, as taught in U.S. Pat. 5,201,246, to Arnold, et al., by forming cam and journal elements, preferably from sheet metal, with outer walls and hubs connected by webs at one axial end of the walls and hubs and attaching those elements to a hollow tube by expanding the tube within the hubs. One important limitation of this technique is the fact that the minimum base circle of the cam and journal elements which can practically be made by this technique is more than the diameter of the tube plus at least six times the thickness of the material from which the elements are made. This limitation is due to the minimum thickness of the forming tool necessary for making a "U"-bend in the material between the hub and outer wall to form the element and, thus, excludes elements with small base circles from application of fabrication by this technique.

Thus, virtually all cam and journal elements for assembled camshafts are currently made by casting, forging, or powder metallurgy techniques; thereby failing to achieve their full potential savings of cost and weight. Moreover, the assembly techniques possible for assembling the cam and journal elements on a tubular shaft have been necessarily limited by the design of the elements to those which rely on expansion of the tubular member to lock the elements in their required axial and radial orientations. This has resulted in increased heat treatment and straightening costs as well as increased capital costs for precision assembly equipment.

The foregoing illustrates limitations known to exist in present assembled camshafts. Thus, it would clearly be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by a method for making a lightweight composite camshaft, comprising the steps of providing at least one lightweight cam element having a lobed outer surface and a hub with a cylindrical bore, at least a portion of said hub not being radially occluded by said outer surface; providing at least one lightweight journal element having a cylindrical outer surface and a hub with a cylindrical bore, at least a portion of said hub not being radially occluded by said outer surface; providing a cylindrical shaft member having an outside diameter sized to form a snug sliding fit in the hubs of said cam element and said journal element; positioning said cam and journal elements on said shaft in required axial and radial orientations; and applying, to the hub of each said element and that portion of the shaft which is in registry with said hub, means for establishing a permanent interlock to fix each said element in its required axial and radial orientation on said shaft.

The foregoing and other aspects will become apparent from the following detailed description of the invention when considered in conjunction with the accompanying drawings.

BRIEF DESCRIPTION OF THE DRAWINGS

FIG. 7b is a sectional view along line b—b of FIG. 7a;

DETAILED DESCRIPTION

Figure 1:
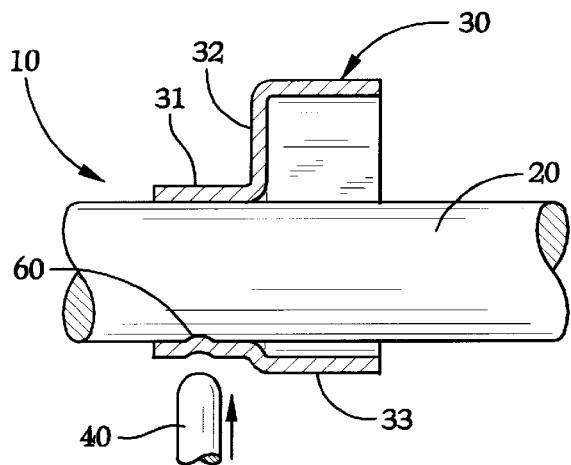
FIG. 1 shows a fragmentary partly sectional view of a camshaft with a solid shaft illustrating a preferred method of assembly according to the invention.

FIG. 1 shows a solid cylindrical shaft member 20 with a cam element 30 installed according to a preferred method of the invention. The cam element has an outer wall 33, a cylindrical hub 31, and a web 32 connecting the outer wall 33 and hub 31. Although this figure only shows the cam element 30, it is equally illustrative of a journal element, the only difference being the cylindrical outer wall of the journal compared to the lobed outer wall of the cam, the cylindrical hub being the same for both elements. The cylindrical hub 31 is sized to provide a snug sliding fit on the shaft 20 and is positioned on the shaft with a required axial and radial orientation as determined by the intended machine application. Of course, in the case of journal elements, only axial orientation or position is significant. After the element is positioned on the shaft 20, a staking tool (or a resistance welding electrode) 40 is applied to the hub to permanently interlock the hub 40 and the shaft 20 together. This secures the element against axial and radial displacement during operation of the cam in its machine or engine. A single stake 60 or resistance weld joint 70 (FIG. 6) is sufficient for providing the required interlock, but it is preferred to form 2 or 3 such features symmetrically spaced around the hub for increased reliability and durability. Staking is the preferred method for establishing the interlock; because it causes no heat effected zone, is more tolerant of impurities and surface finish imperfections, and is, therefore, usually more repeatable.

Figure 2:
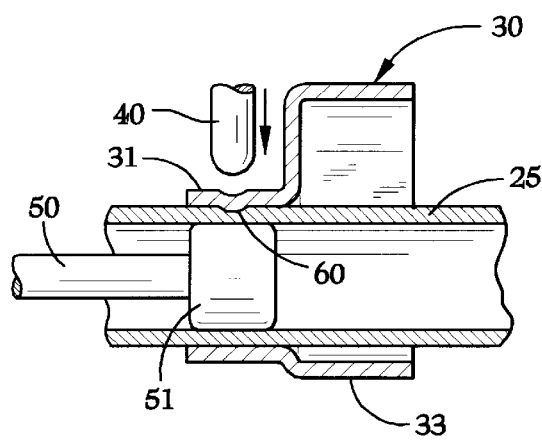
FIG. 2 shows another fragmentary view of the same method of the invention as in FIG. 1 but using a hollow shaft.

FIG. 2 shows an element 30, as in FIG. 1, this time installed on a cylindrical hollow tubular shaft 25 for further weight reduction. In this case, in order to prevent deformation of the shaft 25 during staking or resistance spot welding, a mandrel 50 is inserted in the tube prior to staking or resistance welding. The mandrel provides the required second electrode for resistance welding. It needs only a short end portion 51 with a snug sliding fit in the shaft 25, since it can be indexed from hub 31 to hub 31 along the shaft during the assembly process. This minimizes frictional drag between the shaft 25 and mandrel 50 during the staking or welding operations while still providing the support or electrical contact needed at each hub 31 in succession. Note that the term staking is used for convenience to depict any externally applied mechanical method of causing an interlocking deformation between the hubs 31 and the shafts 20, 25. Thus, staking not only refers to striking the hub with a punch to indent the hub and underlying shaft, but it also applies to roll forming or other mechanical techniques for causing similar deformations.

Figure 3:
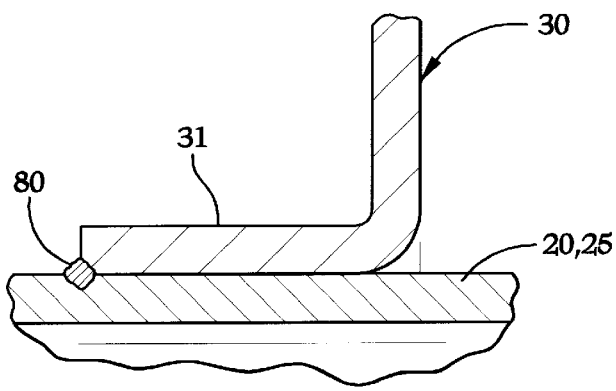
FIG. 3 is a fragmentary sectional view of a fusion weld between an element hub and a shaft provided by the invention.
Figure 4:
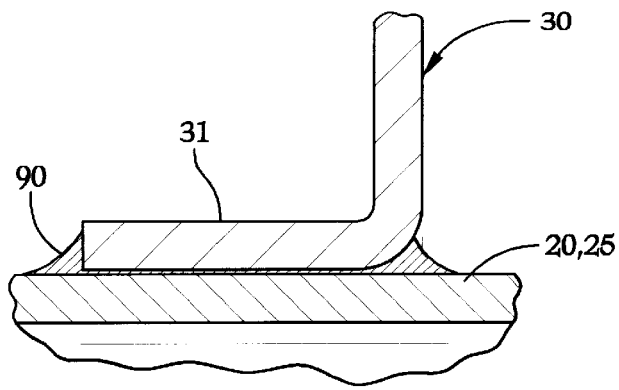
FIG. 4 shows a brazed joint provision viewed as in FIG. 3.
Figure 5:
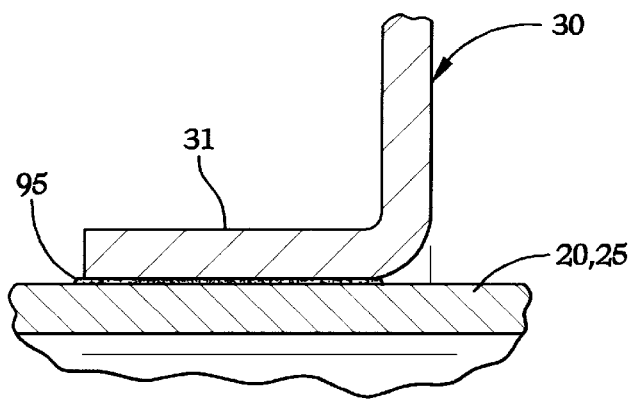
FIG. 5 shows an adhesive bond provision between an element hub and a shaft.

FIGS. 3, 4, and 5 show a fragmentary view of an element 30 installed on a shaft 20, 25 and secured in place by a fusion weld 80, a braze joint 90, and an adhesive bonded joint 95, respectively, between the shaft 20, 25 and the hub 31. For the fusion weld 80, the hub 31 may have a snug fit on the shaft 20, 25, but, depending on the method of placement of the braze material and the adhesive material, some clearance may be needed for those joints. Note that, although brazing is possible using elements with fully radially occluded hubs, the method of the present invention provides for induction heating of the hub only to form the brazed joint without heating the element outer wall, thereby permitting use of fully heat treated elements. This is not possible with fully occluded hubs.

Figure 6:
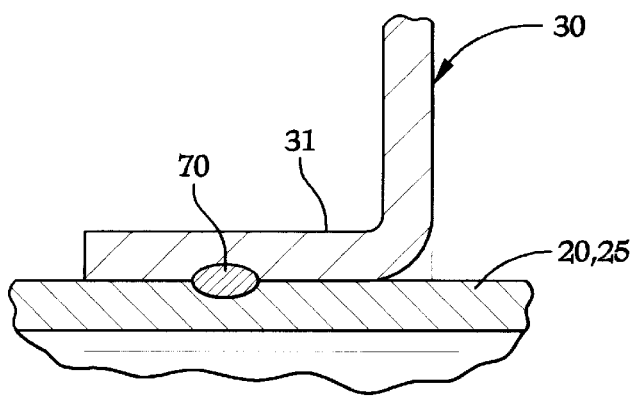
FIG. 6 shows a sectional view of a resistance weld between an element hub and a shaft resulting from application of the method of the invention.

FIG. 6 shows a resistance spot weld nugget 70 formed between the hub 31 and the shaft 20, 25. Properly made resistance welds are very strong and durable, and, of the five methods of providing the required interlock between the element hubs 31 and the shaft 20, 25, they are second only to staking in desirability. However, resistance welding equipment is relatively expensive to buy and to maintain compared to mechanical staking equipment. Accordingly, staking is the preferred method, closely followed by resistance spot welding, and more distantly by fusion welding, brazing, and adhesive bonding.

Figure 7A:
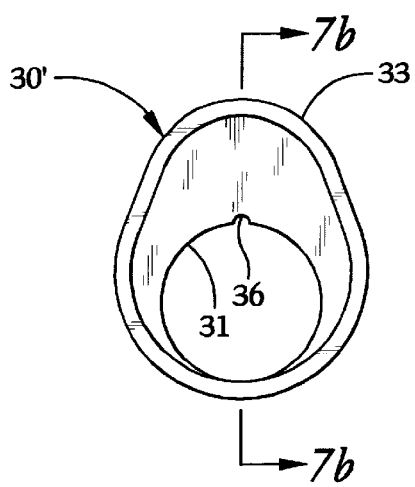
FIG. 7a is an axial view of a cam element with an internally grooved hub.
Figure 7B:
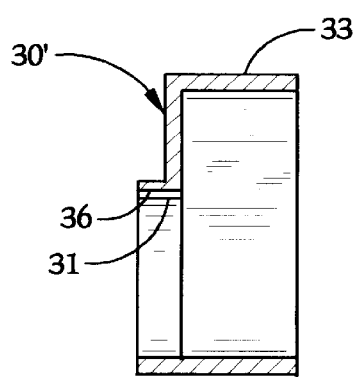
Figure 7C:
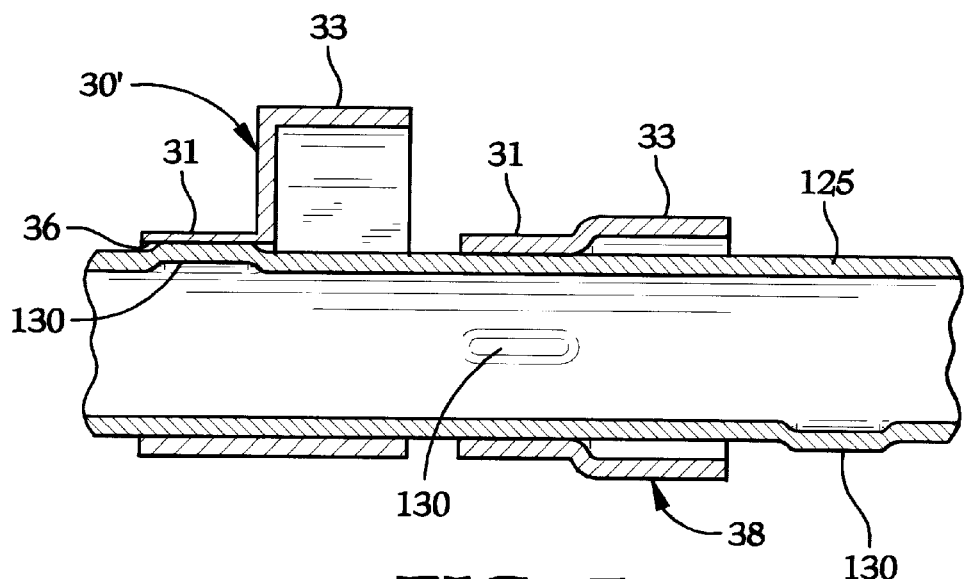
FIG. 7c is a sectional view of another embodiment, according to the invention, providing a locally ridged tubular shaft assembled with cam and journal elements with grooved hubs.

FIGS. 7*a* and 7*b* illustrate an axial view and a radial sectional view of another cam element 30' which can be used in the camshaft assembly method of the invention. This is substantially the same as that shown above, but the hub 31, in this case, has at least one axial groove 36 for keying the element in a radial orientation on a shaft having a properly ridged surface. FIG. 7*c* shows a shaft 125 with short localized axial ridges 130 upon which are assembled a cam element 30' and a journal element 38 having grooves 36 in their hubs 31. Once installed the elements may be secured in place by staking, spot welding, or by a shrink fit. Shrink fitting is accomplished by either heating the elements 30', 38 or cooling the shaft 125, or both, positioning the hot elements on the cold shaft and allowing the elements and shaft to come to ambient temperature. Thermal expansion of the shaft and contraction of the elements provides a much tighter fit than can be mechanically forced together. The grip produced is secure, strong, and durable.

Figure 8A:
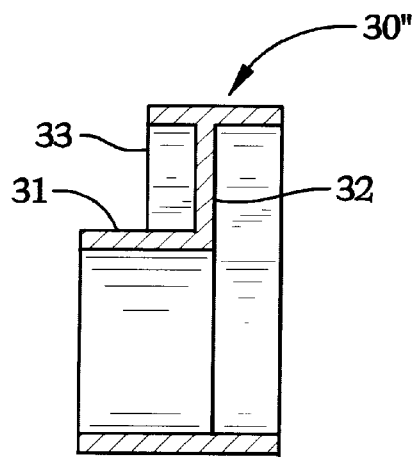
FIG. 8a shows an element having an axially centered web and capable of assembly according to the method of the invention.
Figure 8B:
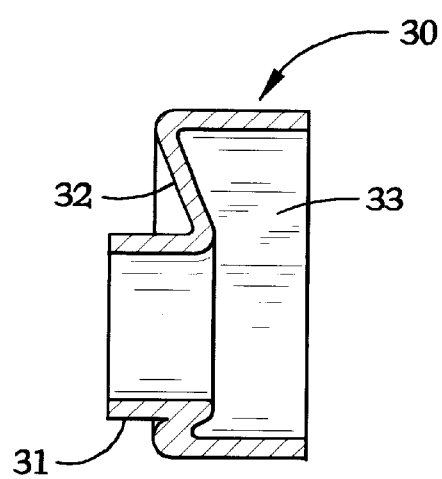
FIG. 8b shows a sectional view of another element with its hub only partially radially occluded by the outer wall, thereby permitting its use in assembly by the method of the invention.

FIGS. 8*a* and 8*b* show radial sectional views of two other elements 30 which permit assembly on a camshaft by the methods of the invention. The element 30" of FIG. 8*a* has an axially centered web while that of FIG. 8*b* has a dished web. In both cases, at least a portion of the hub 31 is not radially occluded by the outer wall 33, even though at least some of the web is axially positioned within the outer wall. The advantages of this invention are made possible by cam and journal elements having such non-occluded hubs; because they expose the hubs alone to radially directed tools and attachment techniques to create the axially and radially interlocked orientation needed for camshafts without affecting the outer walls.

Elements with non-occluded hubs, in addition to permitting all the above methods of making camshafts, can also be used on camshafts using all the methods of the prior art including mandrelizing, ballizing, and all other methods for, either locally or universally, expanding the camshaft tube. However, the methods disclosed above require much less elaborate tooling and fixturing than do those of the prior art and are therefore preferred.

Having described the invention, we claim:

1. A method for making a lightweight composite camshaft, comprising the following steps:

providing at least one lightweight cam element having a lobed outer wall and a hub with a cylindrical bore, at least a portion of said hub not being radially occluded by said outer wall;

providing at least one lightweight journal element having a cylindrical outer wall and a hub with a cylindrical bore, at least a portion of said hub not being radially occluded by said outer wall;

providing a cylindrical shaft member having an outside diameter sized to form a snug sliding fit in the hubs of said cam element and said journal element;

positioning said cam and journal elements on said shaft in required axial and radial orientations; and applying, to the hub of each element and that portion of the shaft which is in registry with said hub, means for establishing a permanent interlock to fix each said element in its required axial and radial orientation on said shaft.

2. The method of claim 1, wherein applying means for establishing a permanent interlock comprises the step of mechanically forming at least one local deformity in the hub and an underlying portion of the shaft.

3. The method of claim 1, wherein the step of providing a cylindrical shaft member comprises providing a hollow tubular shaft member.

4. The method of claim 3, wherein the step of applying means for establishing a permanent interlock comprises the further steps of mechanically forming at least one local deformity in the hub and an underlying portion of the shaft by inserting a mandrel into said tubular shaft, at least part of said mandrel having a smooth cylindrical surface and having a snug sliding fit in said shaft, to register with at least one of the elements and applying a staking tool on the hub of each said element and that portion of the shaft which is in registry with said mandrel to locally deform the hub and the underlying shaft.

5. The method of claim 1, wherein applying means for establishing a permanent interlock comprises the step of making at least one resistance weld joint between said hub and said shaft.

6. The method of claim 3, wherein applying means for establishing a permanent interlock comprises the step of making at least one resistance weld joint between said hub and said shaft.

7. The method of claim 3, wherein applying means for establishing a permanent interlock comprises the step of making at least one fusion weld joint between said hub and said shaft.

8. The method of claim 3, wherein applying means for establishing a permanent interlock comprises the step of making at least one brazed joint between said hub and said shaft.

9. The method of claim 3, wherein applying means for establishing a permanent interlock comprises the step of making at least one adhesive bond between said hub and said shaft.

10. The method of claim 1, wherein the steps of providing said at least one lightweight cam element and one lightweight journal element comprise providing at least one cam element and one journal element, each having an outer wall with first and second axial ends, a hub with a cylindrical bore and first and second axial ends, and a web member extending between the first axial end of said outer wall and the second axial end of said hub, said web member being substantially perpendicular to the outer wall and the hub.

11. A method for making a lightweight composite camshaft, comprising the following steps:

providing at least one lightweight cam element having a lobed outer wall and a hub with a cylindrical bore and at least one axial groove, at least a portion of said hub not being radially occluded by said outer wall;

providing at least one lightweight journal element having a cylindrical outer wall and a hub with a cylindrical bore and at least one axial groove, at least a portion of said hub not being radially occluded by said outer wall;

providing a hollow cylindrical-walled shaft member having a diameter sized to form an interference fit in the hubs of said cam element and said journal element and having external axial ridges at predetermined axial and radial locations;

positioning said cam and journal elements on said shaft in required axial and radial orientations such that the axial grooves in the bores of said elements are in registry with the axial ridges on said shaft surface at the axial and radial locations of said ridges; and fixing said cam and journal elements in their prepositioned locations.

12. The method of claim 11, wherein the step of fixing said cam and journal elements in their prepositioned locations comprises creating a shrink fit between the inside diameter of said hubs and the outside diameter of said shaft to lock said cam and journal elements in their required axial and radial orientations on said shaft.

13. The method of claim 12, wherein the step of creating a shrink fit between the inside diameter of said hubs and the outside diameter of said shaft comprises the steps of providing said shaft at a sub-ambient temperature relative to said elements and said cam and journal elements at a super-ambient temperature relative to said shaft, and, after assembly, permitting said shaft and said cam and journal elements to return to ambient temperature.

14. The method of claim 11, wherein the step of fixing said cam and journal elements in their prepositioned locations comprises applying, to the hub of each element and that portion of the shaft which is in registry with said hub, means for establishing a permanent interlock between said hub and said shaft.

* * * * *